(12) United States Patent
Adachi

(10) Patent No.: US 7,362,458 B2
(45) Date of Patent: Apr. 22, 2008

(54) USAGE RESERVATION SYSTEM FOR NETWORKED PERIPHERALS

(75) Inventor: Tatsuya Adachi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 753 days.

(21) Appl. No.: 09/788,981

(22) Filed: Feb. 20, 2001

(65) Prior Publication Data

US 2001/0015817 A1 Aug. 23, 2001

(30) Foreign Application Priority Data

Feb. 22, 2000 (JP) ............................ 2000-044632

(51) Int. Cl.
*G06F 3/12* (2006.01)
*G06F 15/00* (2006.01)

(52) U.S. Cl. ..................... 358/1.15; 358/1.13

(58) Field of Classification Search ............ 399/81–87, 399/1, 2, 8; 358/1.15, 1.13, 1.14, 1.16, 1.17, 358/1.18, 1.1, 1.2, 1.6, 1.9, 1.11, 400, 401, 358/407, 468; 705/5; 370/322, 348, 443; 712/217; 347/1, 2, 3, 5; 710/8, 15, 62, 64
See application file for complete search history.

(56) References Cited

U.S. PATENT DOCUMENTS 5,467,434 A * 11/1995 Hower et al. .............. 358/1.15
5,552,901 A * 9/1996 Kikuchi et al. ............. 358/468
5,777,882 A * 7/1998 Salgado ..................... 700/214
5,995,723 A * 11/1999 Sperry et al. .............. 358/1.15
6,552,813 B2 * 4/2003 Yacoub ..................... 358/1.1
6,788,426 B1 * 9/2004 Yamanaka et al. ......... 358/1.15

FOREIGN PATENT DOCUMENTS

| JP | 05-176081 | * 7/1993 |
| JP | 06-168085 | 6/1994 |
| JP | 07-168482 | 7/1995 |
| JP | 08-263236 | 10/1996 |

* cited by examiner

*Primary Examiner*—Dov Popovici
(74) *Attorney, Agent, or Firm*—David G. Conlin; Steven M. Jensen; Edwards Angell Palmer & Dodge LLP

(57) ABSTRACT

A server system includes: a driver for allowing client systems to use peripherals; a driver event detecting portion; a usage frequency management table for recording the usage history and a usage history frequency management portion; a reservation management table for registering reservations by operating the usage frequencies and predicting the usage time periods of a peripheral; a data content detecting portion for detecting the content processed through the driver; and a data content management portion for recording the content. The system is configured so that management of setup usage reservations of the peripheral and changing reservations in response to a user request from a client system can be performed.

9 Claims, 17 Drawing Sheets

USAGE RESERVATION SYSTEM FOR NETWORKED PERIPHERALS

BACKGROUND OF THE INVENTION (1) Field of the Invention

The present invention relates to a usage reservation(connection reservation) system for networked peripherals such as a printer, scanner, fax machine and the like.

(2) Description of the Prior Art

Where a server system with peripherals such as printers, fax machines etc., connected thereto is connected to a multiple number of client systems interconnected on a network, there is a demand that these peripherals can be efficiently used from the client side.

For example, in the field of facsimile machines, a data communications system disclosed by Japanese Patent Application Laid-Open Hei 5 No.176081, is configured to perform transmission by estimating time for transmission from the amount of transmission data and determining the time period in which use of facsimile is less frequent from the past transmission log. Similarly in the field of printers, Japanese Patent Application Laid-Open Hei 6 No.168085, Japanese Patent Application Laid-Open Hei 7 No.168482 disclose systems which extract processing time from the past log history.

However, it is impossible to obtain outputs from a peripheral in conformity with the business tasks, by taking into consideration the usage frequency of the peripheral and the amount of data output from the peripheral. In this way, in the conventional art, since the extracted usage times of the peripheral are not exact ones, which are not in conformity with the reservations of user's actual jobs but are those roughly estimated from the usage modes of the apparatus, there are more than a few cases where the user needs to adjust and change the usage reservation to the machine's schedule.

For example, conventionally, concerning register of a connection reservation of a printer, it is difficult to grasp the types, the time periods and volumes of usage reservations because the occupied time ranges differ depending upon the output contents from the printer. Further, if a usage reservation on the peripheral is not executed on schedule and if another user tries to use the peripheral, there could occur an event whereby the peripheral cannot be used despite the fact the peripheral is not in use because the peripheral has been booked for that time. In such a case, it is necessary for the user who is not going to use the peripheral at the scheduled time to cancel the reservation, but this requires tedious work.

Usage reservation of the peripheral may be made unsystematically without considering task priorities. For this reason, there are many cases which cause poor efficiency in view of functions shared by a group. Further, since other than the reservation priorities, some jobs may have a higher priority over others. So when some work is achieved by a group, it is preferred and efficient if the use of peripherals is task-oriented with jobs of more importance taking priority.

Depending upon task priorities, there may occur the necessity of changing the reservations. Such a change of a reservation without informing the user produces confusion in the working environment, definitely resulting in poor efficiency. There is also a demand that the usage reservation having been marked down to be changed should be re-assigned to other time.

SUMMARY OF THE INVENTION

It is therefore an object of the present invention to solve the above problems and provide a usage reservation system for networked peripherals which is able to perform reservation management of peripherals in conformity with demands of the users and practical work environment.

The present invention has been devised in view of the above object and is configured as follows:

In accordance with the first aspect of the present invention, a usage reservation system for setting up connected reservations of peripherals on a network which is made up of a server system with a printer and other peripherals connected thereto and a plurality of client systems interconnected to the server system, is characterized in that the server system comprises: a driver for allowing the client systems to use the peripherals; a detecting portion for detecting the use of a peripheral by a client system; a usage frequency management table for recording the usage history and a usage history frequency management portion; a reservation management table for registering reservations by operating the usage history and predicting the usage time periods of a peripheral; a data content detecting portion for detecting the content processed through the driver; and a data content management portion for recording the content, and the usage reservation system further includes a usage reservation management portion for recording the setup usage reservations of the peripheral into the reservation management table.

In accordance with the second aspect of the present invention, the usage reservation system for networked peripherals having the above first feature, further includes a usage reservation control portion for changing reservations in response to a user request from a client system.

In accordance with the third aspect of the present invention, the usage reservation system for networked peripherals having the above first feature is characterized in that the usage reservation of the peripheral is predicted by extracting and operating the usage frequencies in a time based series, based on the data from the usage frequency management portion and the data content management portion, in arbitrary time spans, such as hours, days, weeks, months, terms, years as the units, and a reservation is made based on that usage prediction.

In accordance with the fourth aspect of the present invention, the usage reservation system for networked peripherals having the above first feature, further includes a means for giving a forenotice of cancellation of a reservation when the reservation is not executed at the reserved time, to the user who made the reservation, and is characterized in that the user who receives the reservation notice or the forenotice of reservation cancellation is allowed to make a modification request.

In accordance with the fifth aspect of the present invention, the usage reservation system for networked peripherals having the above first feature is characterized in that a reservation item left behind after its reserved time is automatically cancelled.

In accordance with the sixth aspect of the present invention, the usage reservation system for networked peripherals having the above first feature is characterized in that the conditions under which a user's reservation is made are determined based on the priority and reservations are changed based on the conditions.

In accordance with the seventh aspect of the present invention, the usage reservation system for networked peripherals having any of the above first, second, third, fourth, fifth or sixth features is characterized in that the user priorities for making reservations are determined based on the degree of task urgency of individual users and the reservations are changed based on the user priorities.

In accordance with the eighth aspect of the present invention, the usage reservation system for networked peripherals having any of the above first, second, third, fourth, fifth or sixth features, further includes a means for informing the user of setup, modification and cancellation of reservations.

In accordance with the ninth aspect of the present invention, a usage reservation system for setting up connected reservations of peripherals on a network which is made up of a server system with a printer and other peripherals connected thereto and a plurality of client systems interconnected to the server system, is characterized in that the server system comprises: a driver for allowing the client systems to use the peripherals; a driver event detecting portion for detecting a driver event; a usage frequency management table for recording the usage history and a usage history frequency management portion; a reservation management table for registering reservations by operating the usage frequencies and predicting the usage time periods of a peripheral; a data content detecting portion for detecting the content processed through the driver; and a data content management portion for recording the content, and the usage reservation system further includes a usage reservation management portion for recording the setup usage reservations of the peripheral into the reservation management table and a usage reservation control portion for changing reservations in response to a user request from a client system.

The usage frequencies of a peripheral with respect to time periods are constant as long as the task modes of the users are not markedly varied. In the present invention, the usage histories of the users of the peripheral are automatically registered so that the time periods in which the peripheral could be used are estimated based on the usage histories. This configuration enables the tasks of the users to be smoothly done. That is, it is possible to manage the reservations of a peripheral taking into account the actual situations of the users.

In the usage reservation system of the present invention, time is divided in an arbitrary time span as a unit so that it is possible to easily grasp the time schedule. Further, it is possible to grasp an improved view of the usage schedule.

Illustratively, as to registering of a job reservation, the reservation time varies depending upon the content of the job. Therefore, it is impossible to grasp the types, the time periods and volumes of usage reservations, using a single time division scheme. In the present invention, the time axis as the scale for measuring time is divided in a constant time unit, so as to solve the problem of multiple time-division.

In the usage reservation system of the present invention, it is possible to prevent lowering of the operating rate due to the peripheral being unused at the reserved time. That is, when a usage reservation on the peripheral is not executed on schedule and if another user tries to use the peripheral, there could occur an event whereby the peripheral cannot be used despite the fact the peripheral is not in use because the peripheral has been booked for that time. The present invention solves this kind of problem.

In the usage reservation system of the present invention, such a reservation is automatically cancelled, so as to improve convenience for other users. That is, if the user who made a reservation does not use the peripheral at the reserved time, the reservation should be cancelled so as to allow other users to use. But this requires tedious work. The present invention deal with this kind of problem.

In the usage reservation system of the present invention, since reservations are made taking into account the priorities, it is possible to improve the work efficiency of the entire group. Usage reservation of the peripheral may be made unsystematically without considering task priorities. For this reason, there are many cases which cause poor efficiency in view of functions shared by a group. The present invention deals with this kind of problem.

Further, in the usage reservation system of the present invention, the degree of task urgency and the reservations of the users are taken into account for making reservations, whereby the work efficiency of the whole group can be improved. That is, in general, other than the reservation priorities, some jobs may have a higher priority over others. So when some work is achieved by a group, it is preferred and efficient if the use of peripherals is task-oriented with jobs of more importance taking priority. The present invention deals with this kind of problem.

Finally, in the usage reservation system of the present invention, the user is able to grasp the varying reservation status by being notified and hence make a timely reservation. That is, depending upon task priorities, there may occur the necessity of changing the reservations. Such a change of a reservation without informing the user produces confusion in the working environment, definitely resulting in poor efficiency. There is also a demand that the usage reservation having been marked down to be changed should be re-assigned to other time. The present invention deals with this kind of problem.

DESCRIPTION OF THE PREFERRED EMBODIMENTS

The present invention handles usage reservations of a peripheral based on its usage-frequency history and taking into consideration the user's routines. The present invention also aims at smooth use of a peripheral and improving the efficiency in the working environment, by informing the user of the reservation status and setting the user's reservations of the peripheral, based on the type of jobs and working schedule.

The present invention will be described hereinbelow with reference to the embodiment illustrated.

Figure 1:
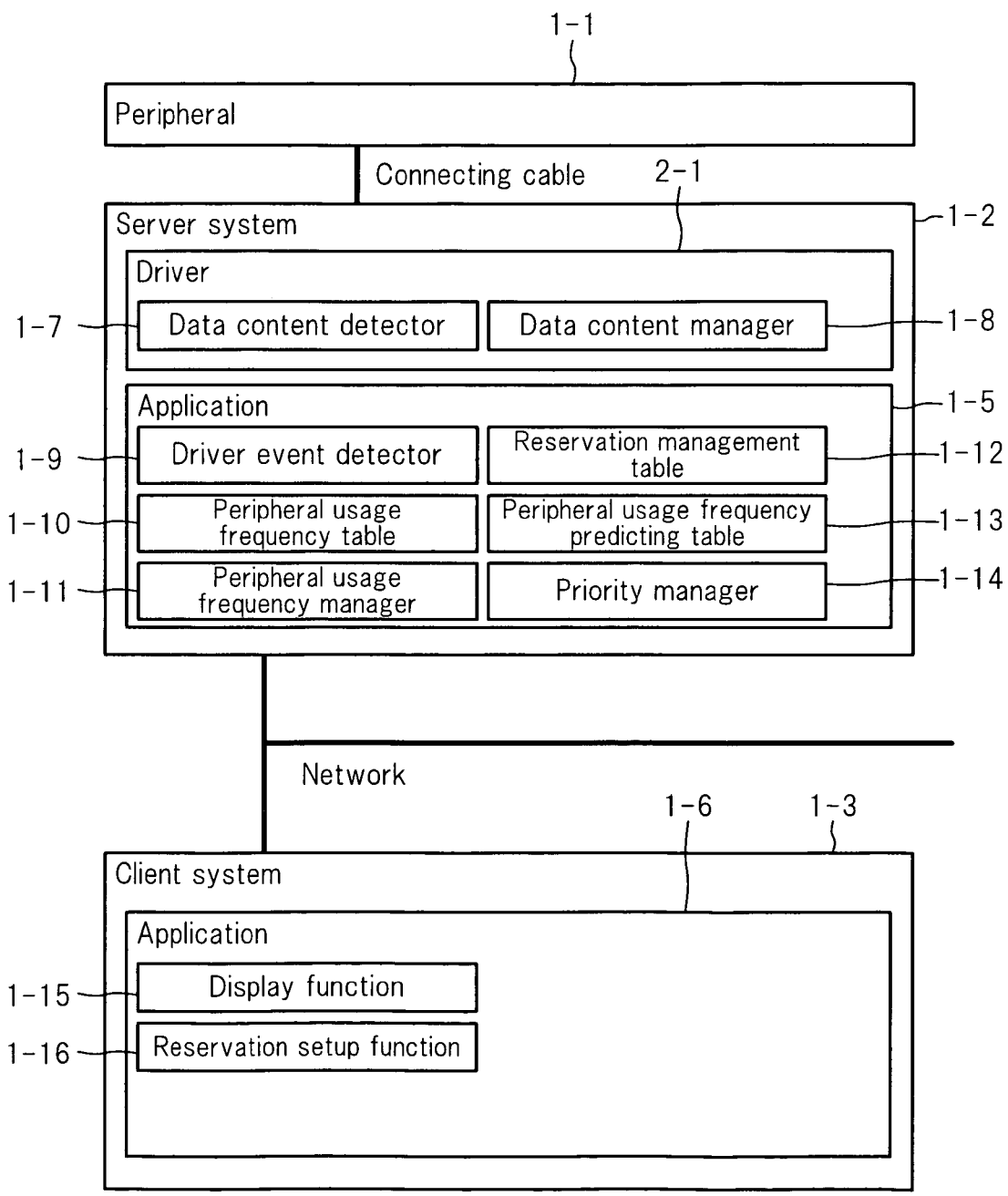
FIG. 1 is a diagram showing the configuration of modules in a usage reservation system of the present invention.

FIG. 1 is a diagram showing the configuration of modules of the present invention. The main part is comprised of a peripheral (1-1) such as a printer, scanner, fax machine or the like, a server system (1-2) locally connected via connection cable to the peripheral (1-1) and a plurality of client systems (1-3) made up of personal computers (client PCs) interconnected on the network to the server system (1-2).

The server system (1-2) incorporates a driver (2-1) and an application (1-5) proposed in the present invention. The driver (2-1) on the server side includes a data content detector (1-7) and data content manager (1-8). The application (1-5) on the server side includes a driver event detector (1-9), peripheral usage frequency table (1-10), a peripheral usage frequency manager (1-11), reservation management table (1-12), peripheral usage predicting table (1-13) and priority manger (1-14).

Figure 2:
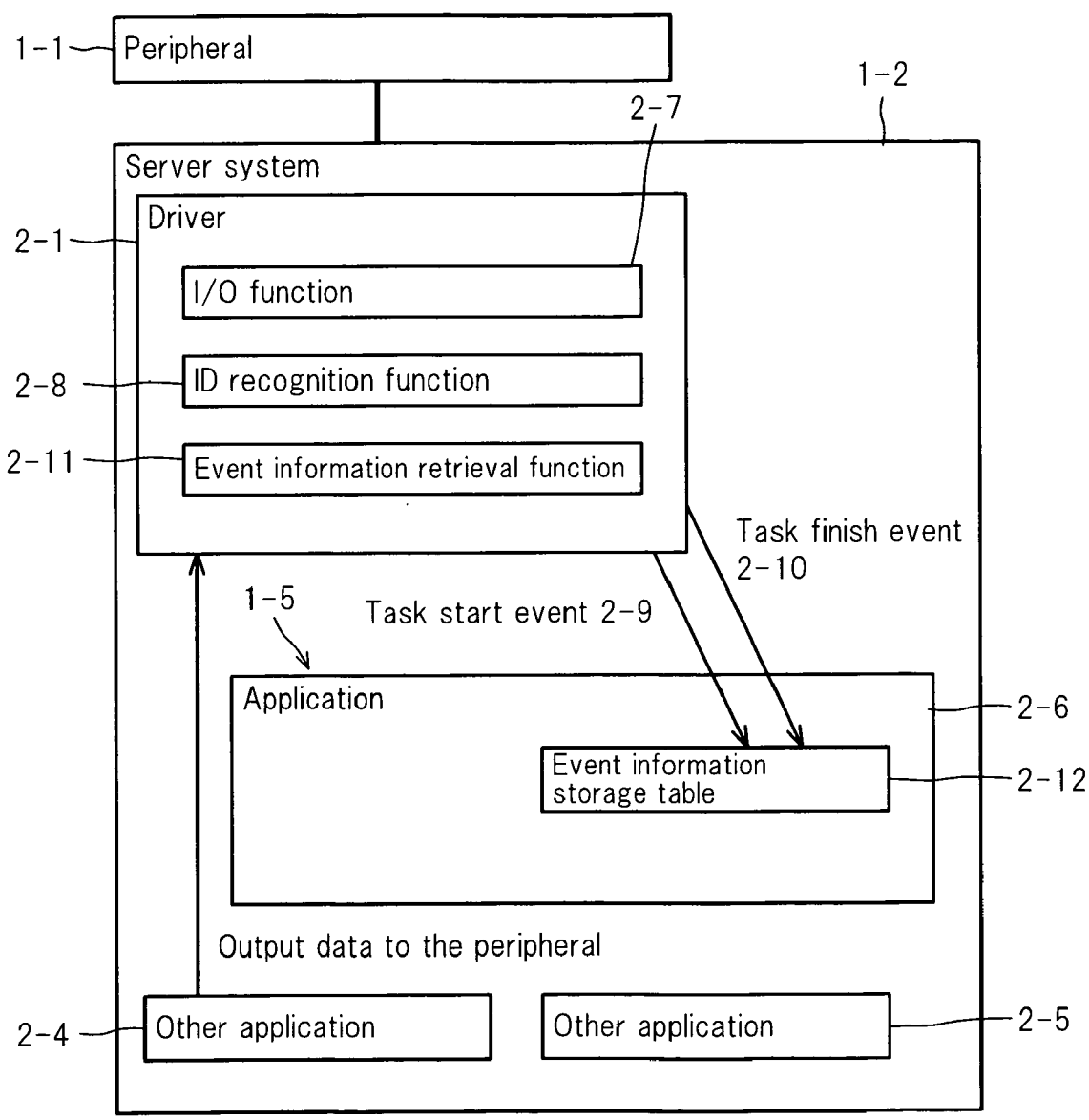
FIG. 2 is a diagram showing part of the configuration of the usage reservation system of the present invention.

Provided in a client system (1-3) is a module (1-6) of the present invention having an application form. This application (1-6) on the client side has a display function (1-15) and reservation setup function (1-16). In FIG. 2, driver (2-1) on the server side is a module for controlling the usage of peripheral (1-1), and when an input or output task is performed from the server system (1-2) to the peripheral (1-1), the output task data necessarily passes by way of the driver (2-1). This input/output of data is cognized by one of the application (1-5) in the server system(1-2), specifically, an application (2-4), but other applications (2-5) which serve for other processes generally perform their tasks without recognition of the peripheral being used.

To being with, the driver (2-1) has the following configuration for issuing an event to the application (2-6) of the present system when an input or output task occurs in the driver (2-1).

The driver (2-1) has an input/output function (2-7) corresponding to the start and finish of a task, accessible from an external module. The configuration of issuing events to the application (2-6) of the present system is provided within this function. The driver (2-1) has an ID recognition function (2-8) as an external function for storing the IDs of the application (2-6) of the present system. The IDs are memorized based on this ID recognition function, and when the function corresponding to the start or finish is called externally, a task start event (2-9) or task finish event (2-10) is issued to the application corresponding to the ID, so as to inform the application (2-6) in real-time that the peripheral (1-1) is currently being used. When the driver (2-1) notifies an event to the application (2-6), the event is accompanied by some data. This data contains, the peripheral ID, user, task type or either input or output, task start time and task finish time. These pieces of information are stored in an event information storing table (2-12) provided in the memory area in the driver (2-1) while an external reference function shown in FIG. 2 as an event information retrieval function (2-11) is provided so that the application (2-6) receiving an event can access to the corresponding information. The application (2-6) when receiving an event calls this event information retrieval function (2-11) as the function provided in the driver for retrieving the event information, is able to obtain the access information such as the peripheral ID, user, task type or either input or output, task start time, task finish time and the like.

Figure 3:
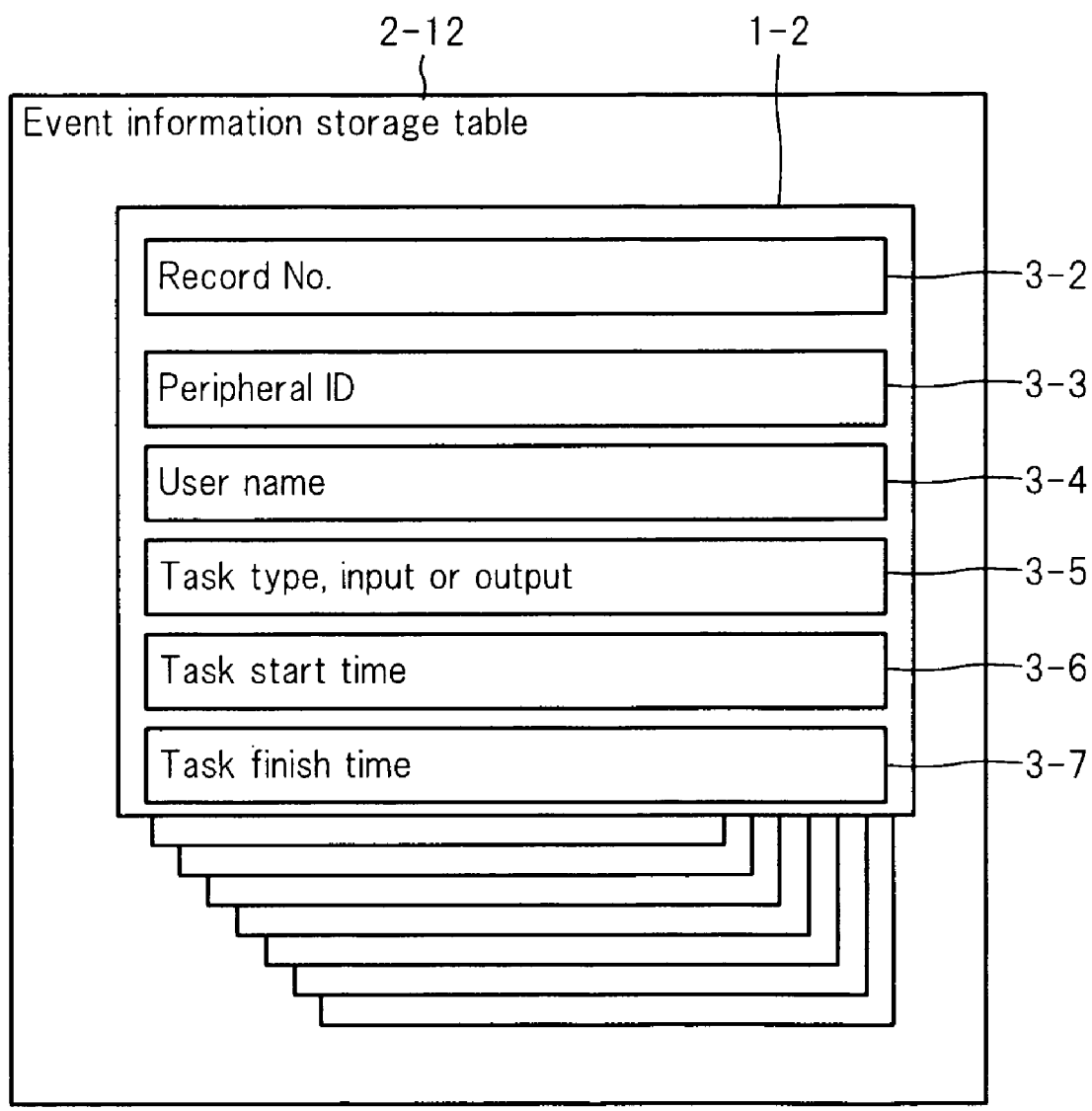
FIG. 3 is a diagram showing the overall arrangement of an event information table stored in a storage area within the driver of FIG. 1.

FIG. 3 is a diagram showing the overall arrangement of the event information storing table (2-12) for storing event information, stored in a storage area within the driver.

Each record (3-1) contains multiple items, specifically, record number (3-2), peripheral ID (3-3), user name (3-4), input/output type (3-5) for determining either input or output, task start time (3-6), task finish time (3-7). Since the record number (3-2) of this table is notified when an event is informed to the application (2-6), the application (2-6) receiving the event is able to obtain the event information associated with the record number (3-2) by sending this record number (3-2) as the argument of the function.

Figure 4:
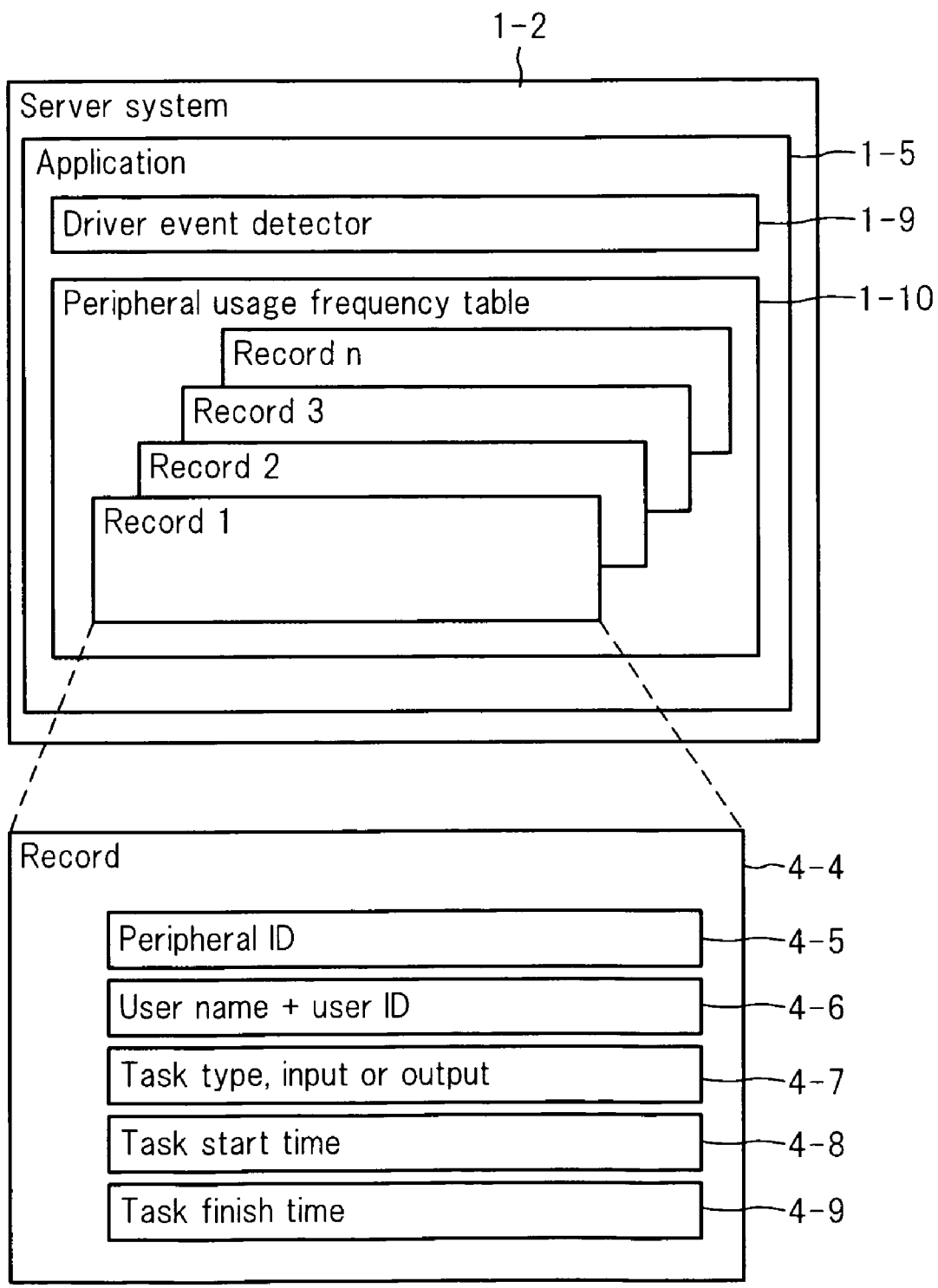
FIG. 4 is a diagram showing the arrangement of the peripheral usage frequency table of FIG. 1.

FIG. 4 is a system diagram for illustrating how to record an event, in accordance with the present invention.

Based on the aforementioned functions of the driver, the application (1-5) of the present system causes the driver event detector (1-9) to detect the event issued from the driver when the function representing the start or finish is called externally, so as to retrieve the function prepared in the driver and obtain the access information of the peripheral. This information is registered as record information, namely a record (4-4) in the peripheral usage frequency table (1-10) allotted in the storage of the system every time an event arises. In the peripheral usage frequency table (1-10), the aforementioned access information including peripheral ID (4-5), user name +user ID (4-6), input/output type (4-7), task start time (4-8), task finish time (4-9) and the like, is adapted to be stored as a single record (4-4) so that one transaction is represented by one record (4-4).

Figure 5:
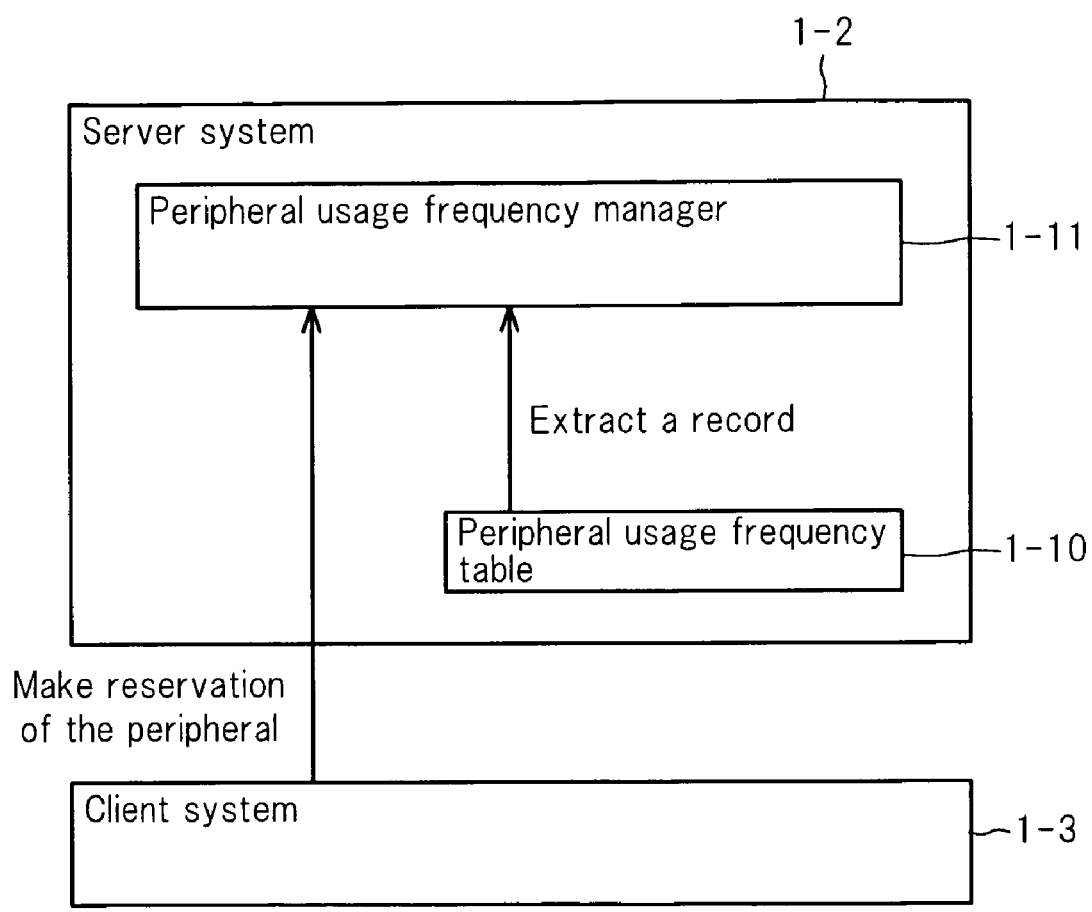
FIG. 5 is a diagram showing the arrangement of the peripheral usage frequency manager of FIG. 1.

FIG. 5 is a diagram showing the peripheral usage frequency manager (1-11).

Peripheral usage frequency manager (1-11) has the following configuration. When a usage reservation of a peripheral is made from a client system (1-3) as a user terminal, the manager calculates the time from the start time to the finish time period of the reservation and extracts records which involve the calculated time period from the peripheral usage frequency table (1-10). With respect to the extracted records, the manager also calculates the time periods that the tasks associated with the extracted records were operated within in the past, so as to estimate the possibility of the peripheral being used in the time period for which the user is making a reservation. The estimated result is stored in the flag area to be described hereinbelow.

Figure 6:
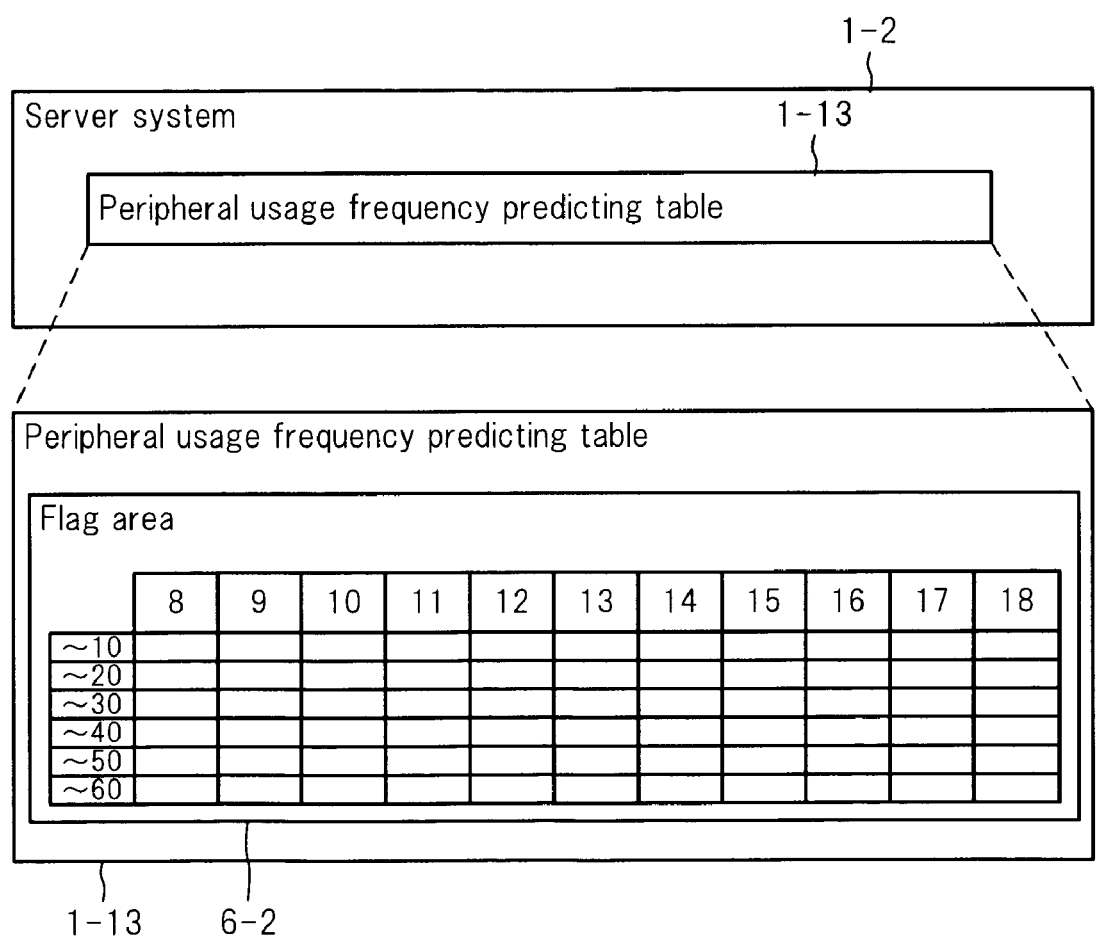
FIG. 6 is a diagram showing a flag area of the peripheral usage predicting table of FIG. 1.

FIG. 6 is a peripheral usage predicting table (1-13) for explaining the flag of the peripheral usage predicting table.

For prediction, the peripheral usage predicting table (1-13) is used. This peripheral usage predicting table (1-13) includes several kinds of flag areas (6-2) each arranged along the time axis so that the reservation time periods designated by users, the time periods as to the extracted records can be represented with set flags. Each flag area is time-divided into blocks of certain time units, so as to record any reservation from its start time to finish time. The divided blocks each having a certain time unit are recognized as areas with set flags. Thus, flags are, one by one, set in blocks, each having a certain time unit, in the flag area (6-2) in the peripheral usage predicting table (1-13). Since these flags are set for the extracted reservations, they are merged one after another into the flag area (6-2). When the flag areas (6-2) in the peripheral usage predicting table (1-13) after the flag merging process are checked, the areas with no flag set are determined as being not booked.

Figure 7:
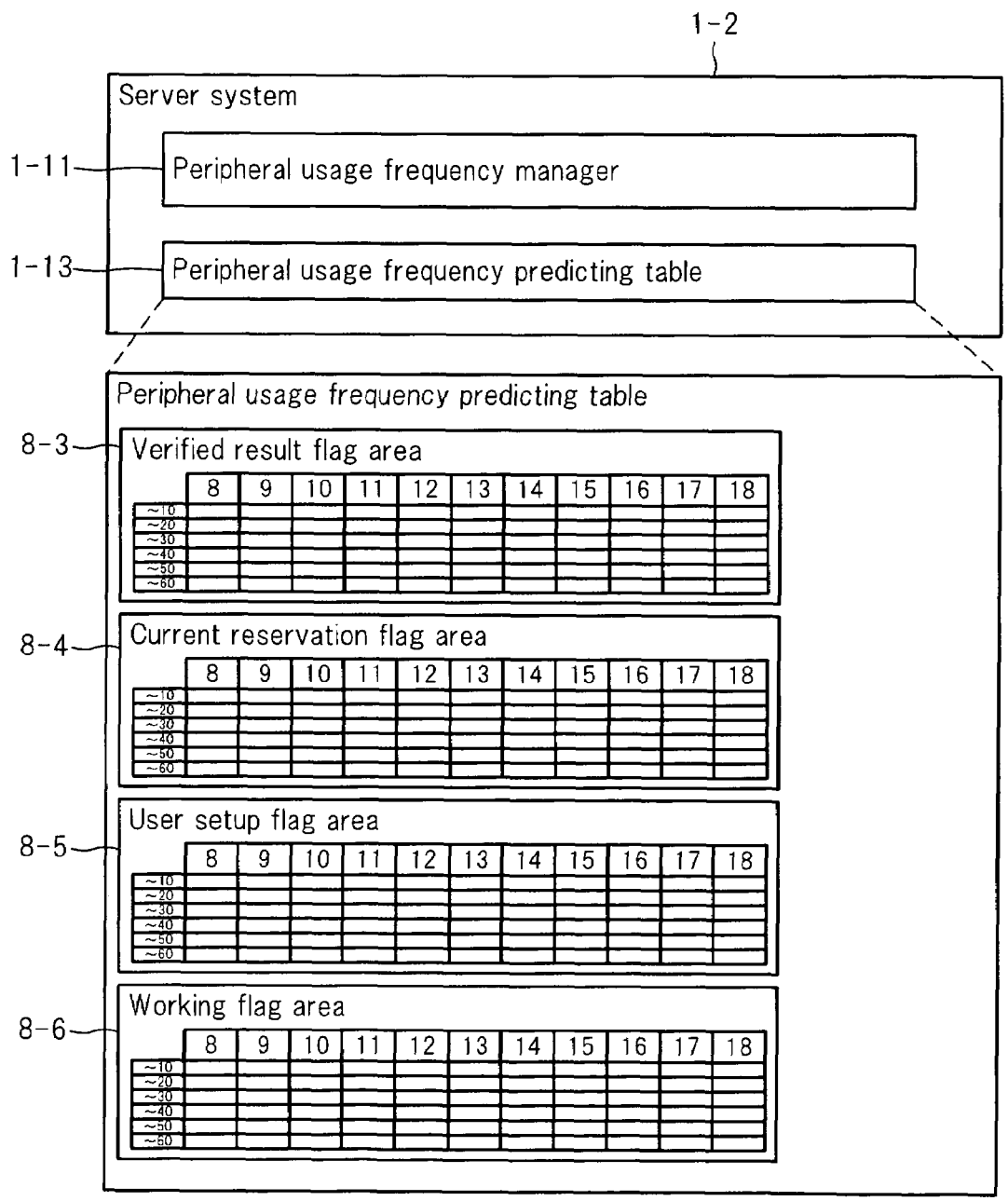
FIG. 7 is a diagram showing the configuration of the peripheral usage predicting table of FIG. 1.

FIG. 7 is a diagram showing the configuration of a peripheral usage frequency manager for illustrating the peripheral usage frequency manager (1-11) and its flag areas.

The peripheral usage frequency manager (1-11) has the function of setting up time information in flag forms into the flag area in the peripheral usage frequency predicting table (1-13) and determining that no reservation has been made in the time periods with no flag set. The verified result by this function is set into a verified result flag area (8-3) arranged in the peripheral usage frequency predicting table (1-13). This manager also uses a current reservation flag area (8-4) for taking into account the current reservation status.

When any flag has been set within the time period designated by a user, the priority of the reservation should be taken into account. The priority used here may be determined previously or may be set up at the time of reservation. If the previously made reservation has a lower priority over the current reservation, change of the reservations should be made. This change is performed based on the priorities, the reservation to be displaced is informed to the associated user so as to urge the user to reset and make a new reservation. Generally, the reservation to be changed is shifted to a subsequent slot unless otherwise specified.

Figure 8:
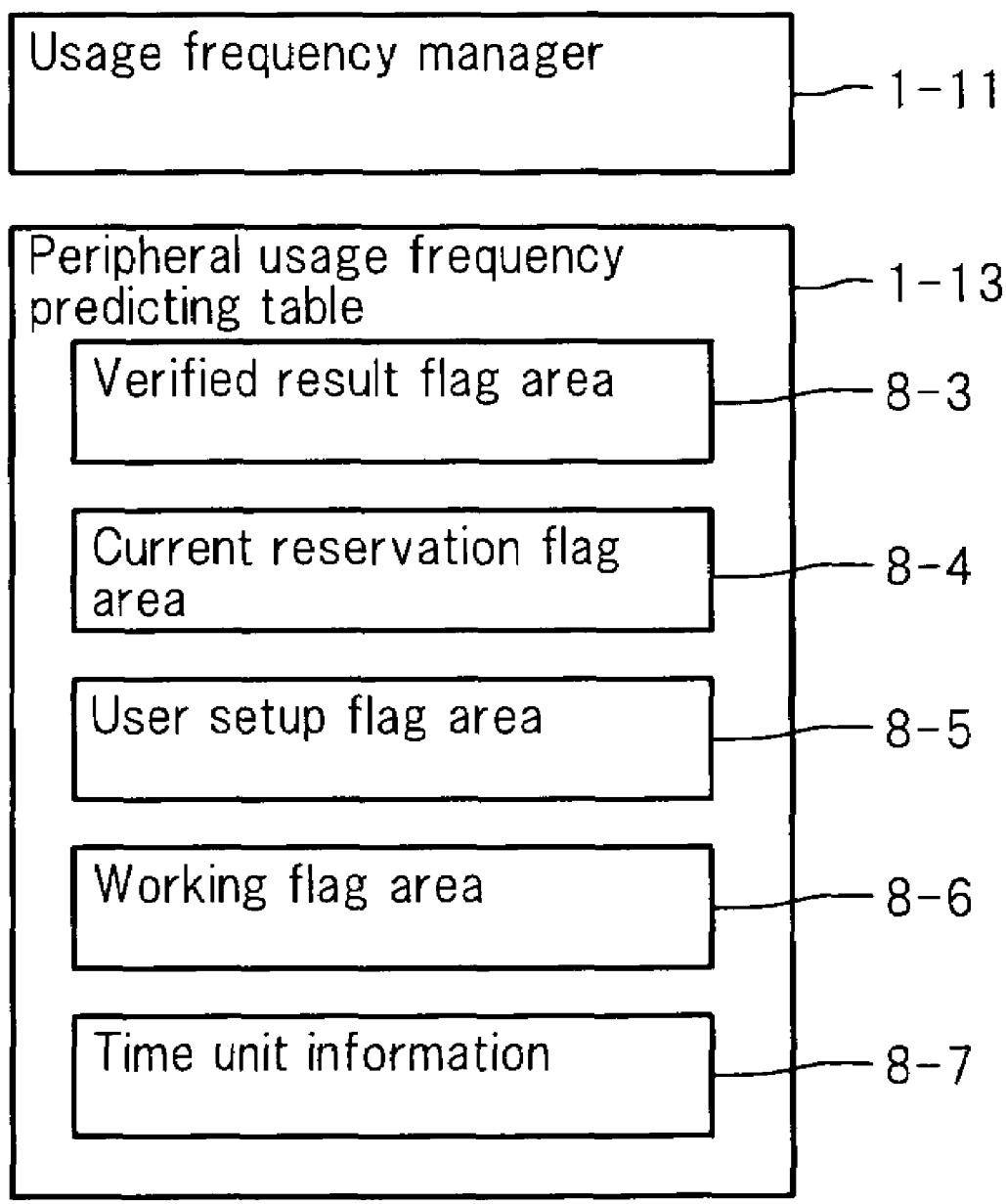
FIG. 8 is a diagram for illustrating the usage frequency manager of FIG. 1.

FIG. 8 is a diagram for illustrating the usage frequency manager (1-11).

In the usage frequency manager (1-11), the verified result flag area (8-3), current reservation flag area (8-4), a user set flag area (8-5) set by users and a working flag area (8-6), all existing in the peripheral usage frequency predicting table (1-13), are used. In order to divide these flag areas into certain time units, a time unit information storage area (8-7) as the area for storing time unit information is provided in the usage frequency manager. When a flag is set, this time unit information storage area (8-7) is referenced to so as to check what time unit is currently being used and make the conversion. This configuration makes possible reservation management in a time based series.

Illustratively, in this usage reservation system for networked peripherals, it is possible to make predictions and reservations in hours, days, weeks, months, terms, years as the unit, by extracting and calculating the usage frequencies in a time based series based on the data from the usage frequency manager (1-11) and the data contents manager (1-8).

Figure 9:
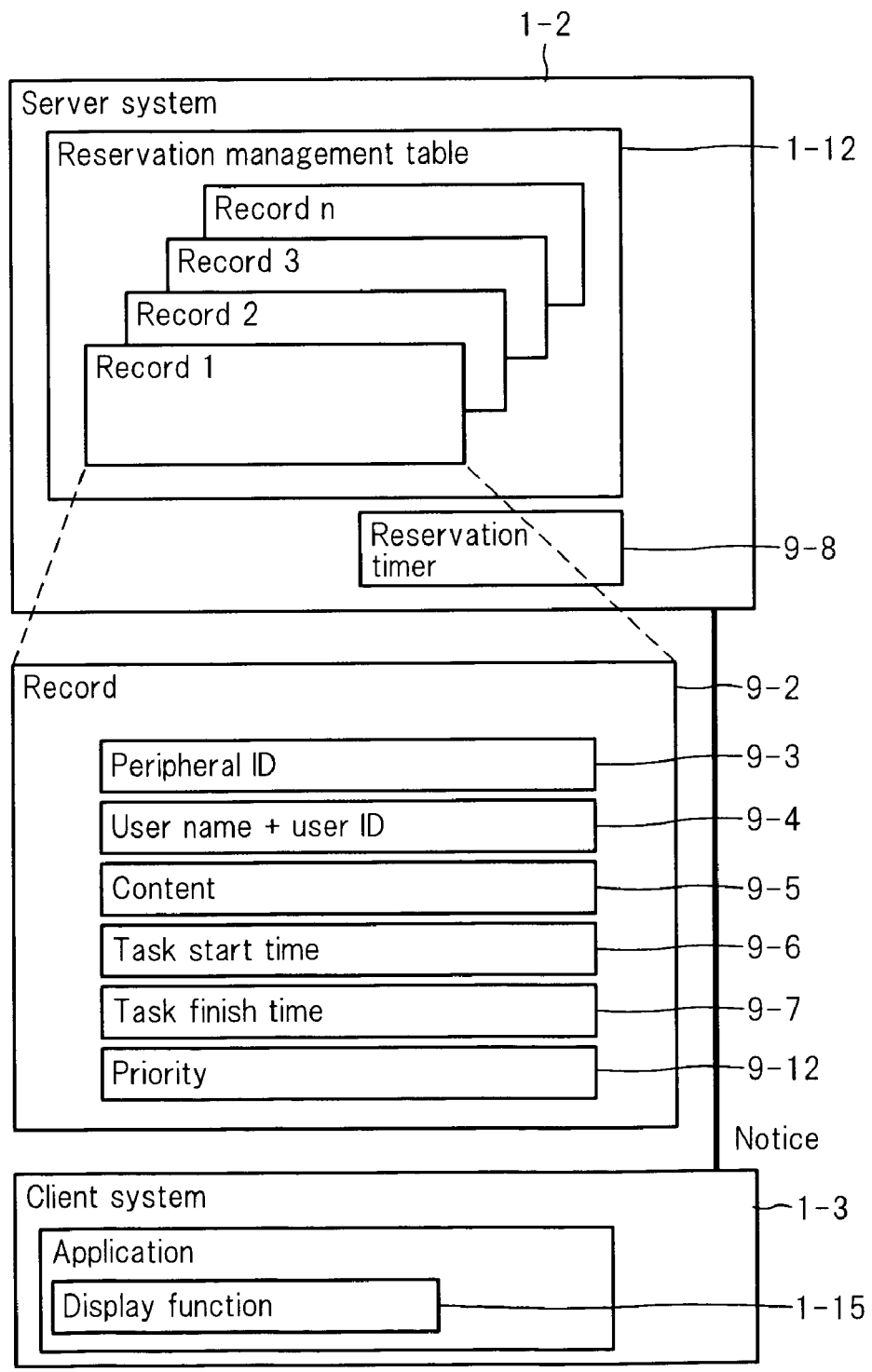
FIG. 9 is a diagram for illustrating cancellation forenotice and modification request according to the present invention.

FIG. 9 is a diagram for illustrating cancellation forenotice and modification request.

In FIG. 9, the reservation management table (1-12) has registered information as reservations made up to the present as records (9-2). Each record contains peripheral ID (93), user name+user ID (9-4), content (9-5), task start time (9-6), task finish time (9-7) and priority (9-12). For each record of information, the usage reservation manager causes a reservation timer (9-8) to poll the reservation time, so that the manager detects the usage status of the user and driver when it reaches the reservation start time, and compares the job of the reservation with the reservation management table (1-12) and to verify if the job of the reservation is actually executed. If the job is not executed, the status is informed by means of display function (1-15) of client system (1-3) to the user who made the reservation while the reservation is cancelled. Further, display function (1-15) is used to inquire of the user whether reservation should be made again. A user who has received the reservation notice or reservation cancellation forenotice is allowed to make a modification request.

With this configuration, it is possible to prevent lowering of the operating rate, due to the peripheral being unused, at the reserved time.

Figure 10:
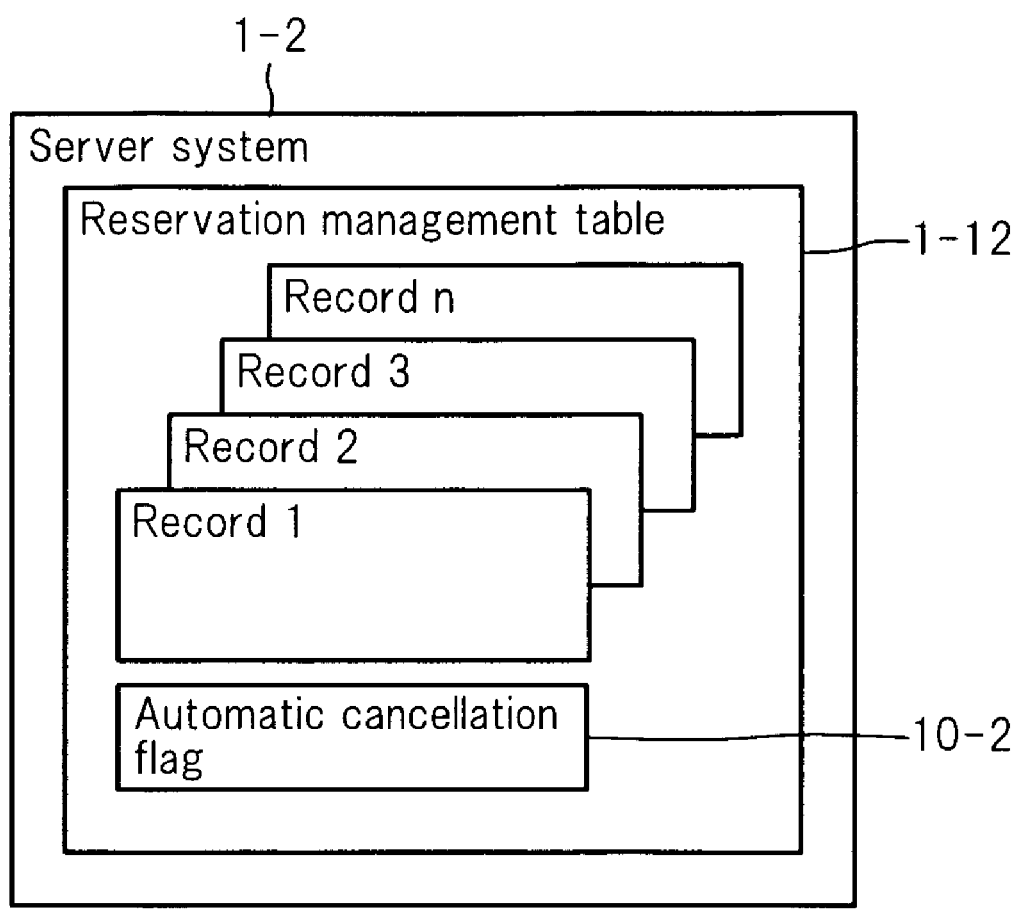
FIG. 10 is a diagram for illustrating automatic cancellation of reservation of a job which is behind schedule and left undone.

FIG. 10 is a diagram for illustrating automatic cancellation of reservation of a job which is behind schedule and left undone.

An automatic cancellation flag (10-2) for determining whether automatic cancellation should be made is added to the reservation management table (1-12). If this flag has been set, the reservation is automatically cancelled when a user does not use the peripheral for the reserved job on time. In this case, no notice is given to the user. Thus, this automatic canceling configuration improves the usefulness for other users.

Figure 11:
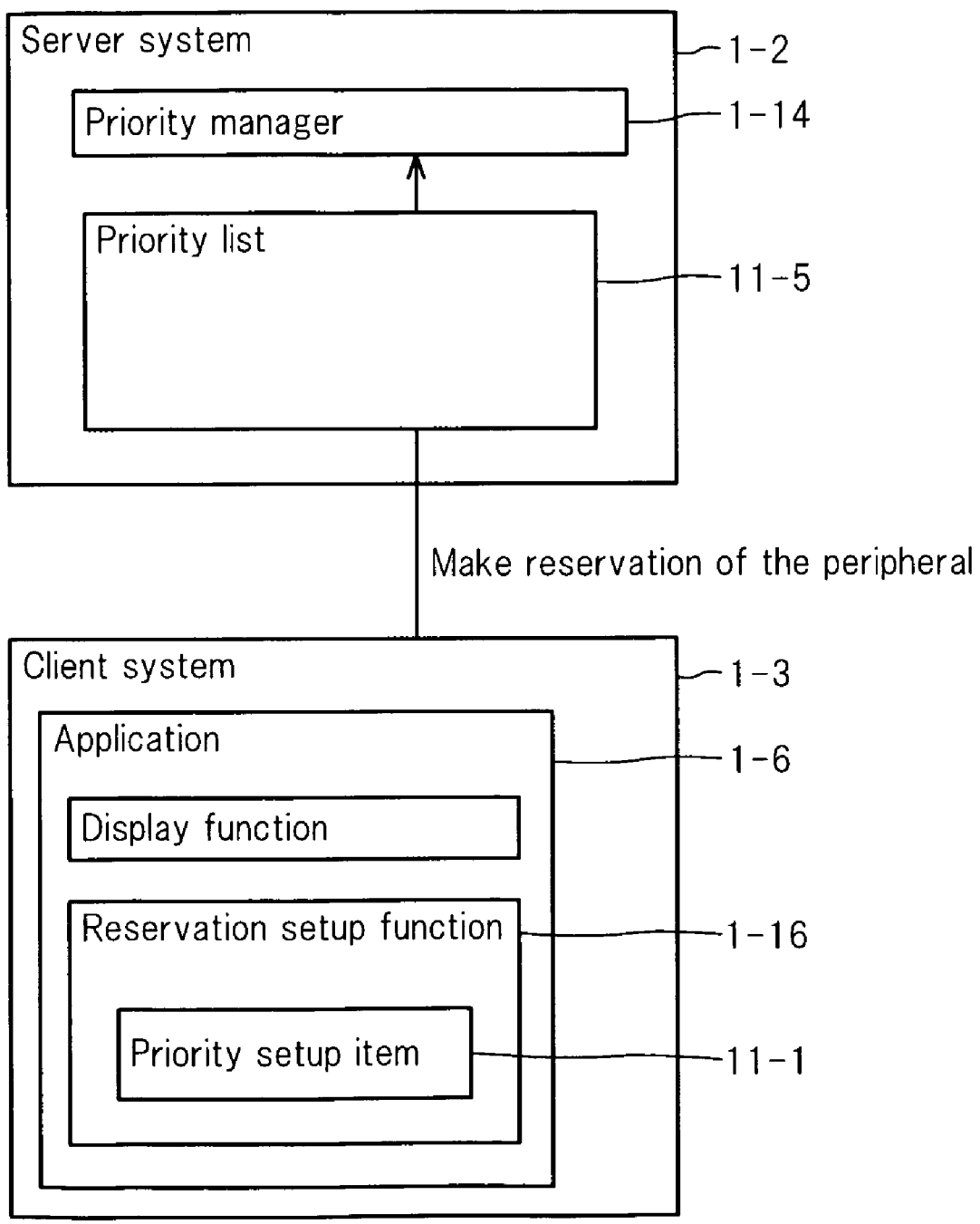
FIG. 11 is a diagram for illustrating the arrangement for setting or modifying reservations taking into account the priorities according to the present invention.

FIG. 11 is a diagram for illustrating the arrangement for setting or modifying reservations taking into account the priorities.

This can be achieved by adding a priority item (11-1) as a criterion based on which user's reservation priorities are determined. The priorities should be determined by the system supervisor and stored previously in the priority manager (1-14). When a user makes a reservation from a client system (1-3), the user makes the reservation whilst obtaining the priority list (11-5) from the server system (12-1). The obtainment of this can be done without the user being aware of it. Provision of this feature makes possible efficient change of reservations, thus improving the work efficiency as of the whole group, for example.

Figure 12:
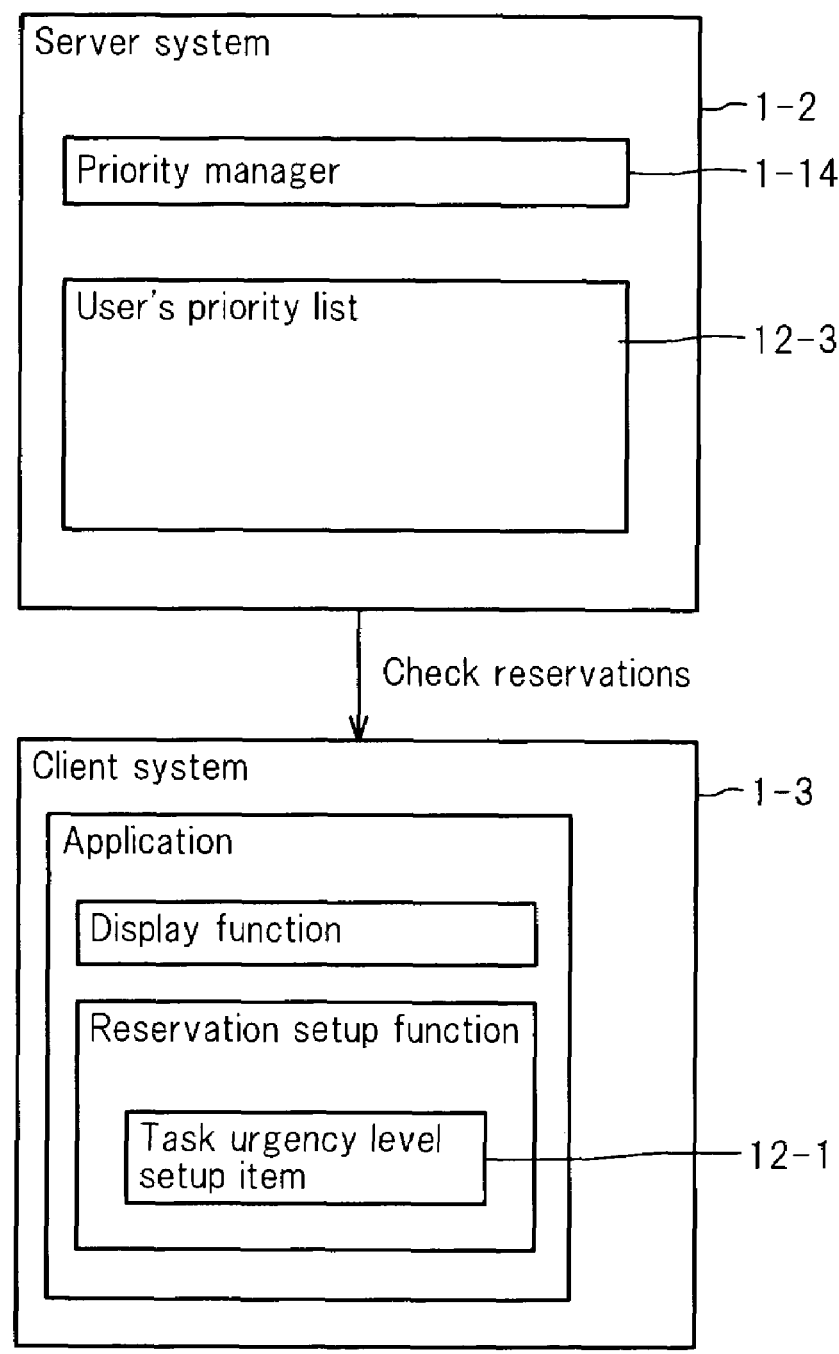
FIG. 12 is a diagram for illustrating the arrangement for modifying reservations according to the task priorities which have been determined based on the degree of task urgency, in accordance with the present invention.

FIG. 12 is a diagram for illustrating the arrangement for modifying reservations when setting of user reservations is determined according to user's priorities which have been determined based on the degree of task urgency.

This configuration is realized by providing a task urgency level setup item (12-1) on the client side for designating the level of task urgency as a priority of the user's reservation. A user priority list (12-3) can be added as a listing item for controlling the grade of users who make reservations to the priority manager (1-14) on the server side. In this case, when a user from a client system (1-3) makes a reservation by designating it to be a high degree of task urgency under the consensus of the users, the priority is determined on server system (1-2) based on the user priority list (12-3) representing the grade of users.

Figure 13:
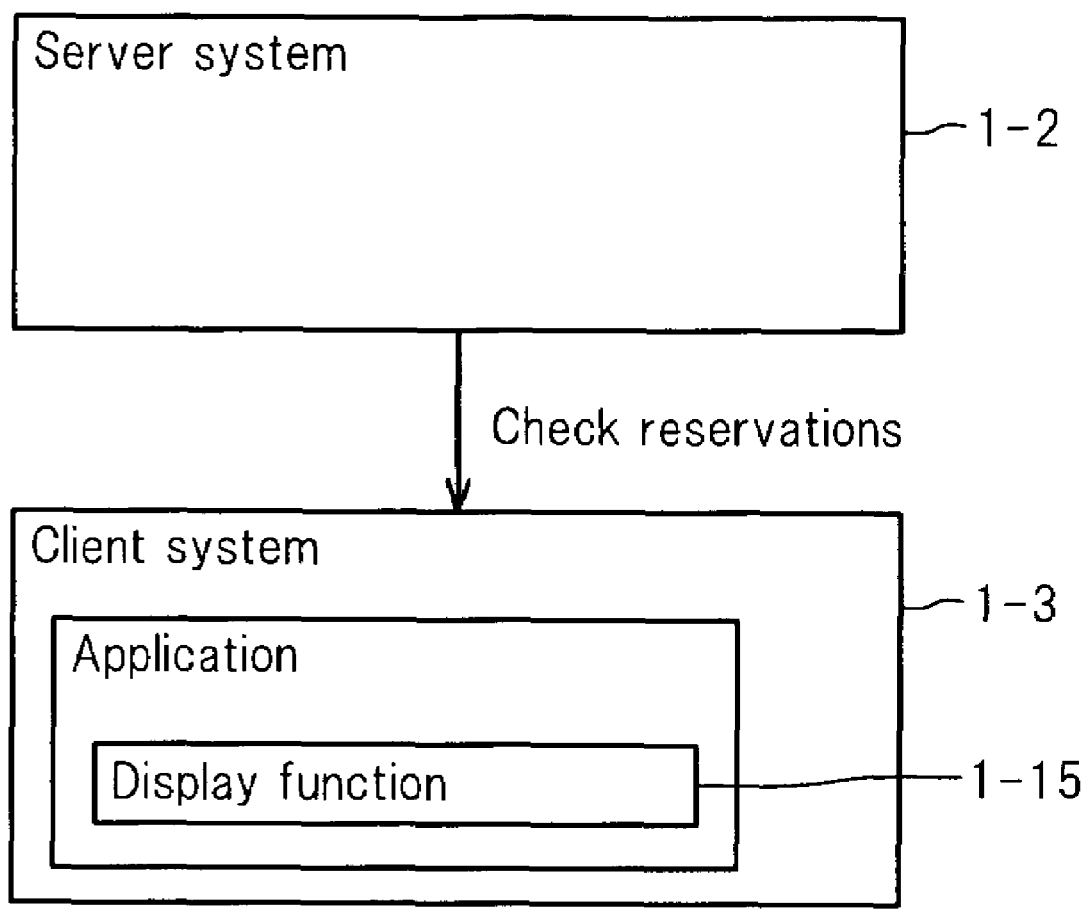
FIG. 13 is a diagram for illustrating notification arrangement when reservations need to be changed, in accordance with the present invention.

FIG. 13 is a diagram for illustrating notification arrangement when reservations need to be changed.

Considering the priority for entry of a peripheral reservation, there are cases where reservations need to be changed according to his/her priority when a certain user makes a reservation. Change of reservations may be made automatically. Usually, however, a notification must be given to the user or users having made the reservations overlapping the new reservation. Otherwise, the user could be confused.

Made in the server system (1-2) is a search for whether any reservation exists in the same time period as the new reservation. If there exists a reservation, this will be informed to the associated users by means of the display function (1-15) of client systems (1-3). This informing arrangement functions as a means for notifying the reservation setup, modification, cancellation to the users.

OPERATIONAL EXAMPLE

Now, the operation of the configuration shown in FIG. 1 wherein usage reservations of a peripheral are made based on the usage frequency history of the peripheral under the daily work environment of the users will be described along with the flowcharts, by taking a case where usage reservations of a printer as the aforesaid peripheral are made based on the contents of the working schedule, and the reservation status is informed to the users so as to pattern smooth usage of the printer and improvement of the work efficiency.

When the driver (2-1) prints some documents, the peripheral (1-1) or the printer is selected from the print start frame to start printing. As printing starts, the driver (2-1) is called and data is transferred so that printing by the peripheral (1-1) or the printer starts. Since printing is started or ended by way of the driver (2-1), the driver is able to detect the print start and print end. This feature is in common with peripherals such as fax machines, scanners, mail communications other than printers, so that it is possible to store the event information into the memory area of the application (1-5) in the server system (2-1) as long as these peripherals are driven by way of driver (2-1).

Figure 14:
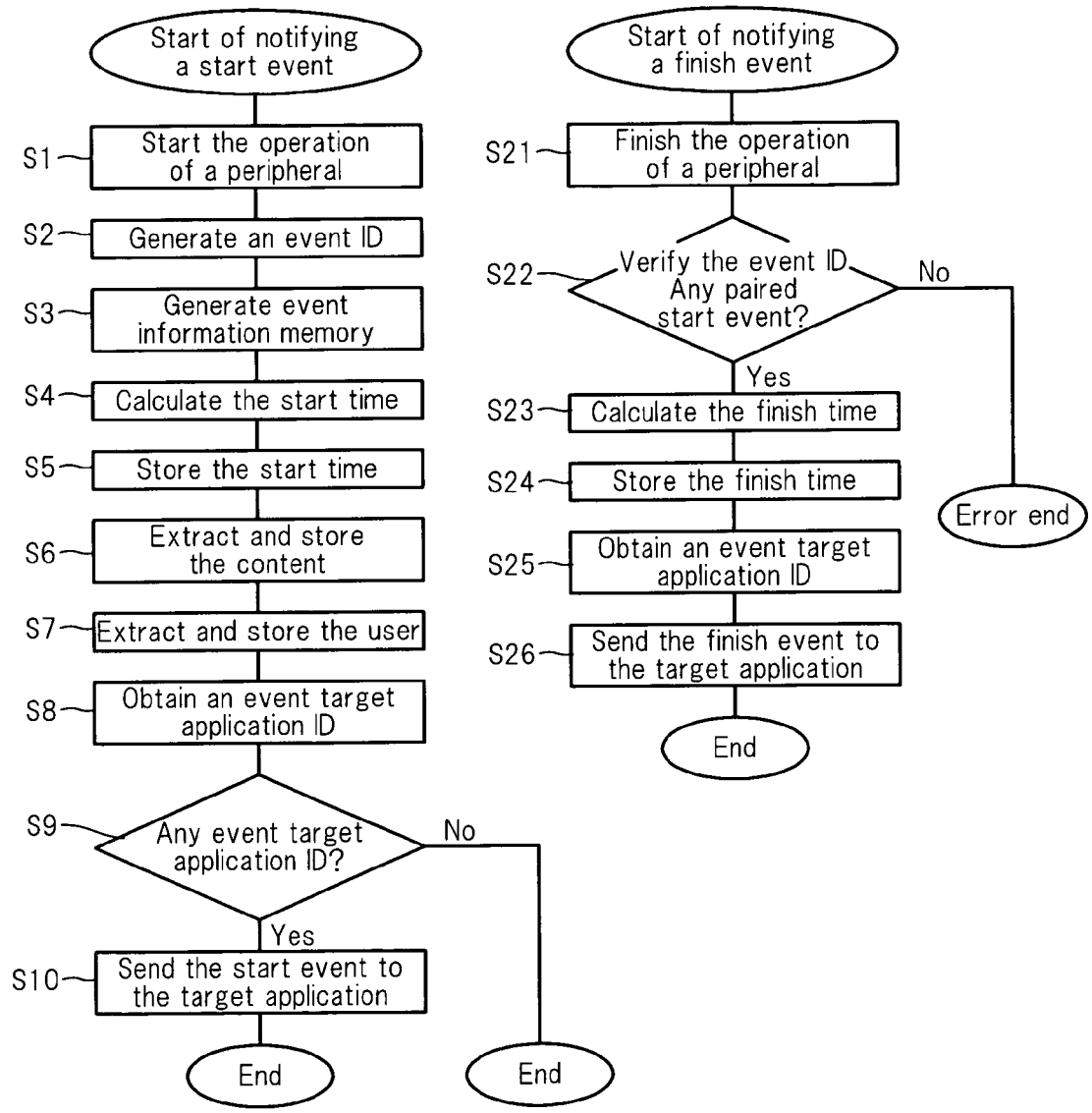
FIG. 14 is a flowchart showing the flow (in the driver) for recording the operation history, in accordance with the present invention.

The flow of operation history recording in the driver will be described with reference to FIG. 2 and FIG. 14 for illustrating the flow (in the driver) of recording the operation history.

To record the usage history, driver (2-1) needs to incorporate a mechanism for assisting the function. The operation flow is shown in FIG. 14. When the peripheral is used by a certain application (2-4), the driver can know the start of usage (S1). Upon this detection, the driver prepares to generate an event to the application. That is, the driver generates an event ID (S2) and generates an event information storage for allowing the application to request the data associated with the event by way of external function (2-11) in the driver (S3).

The driver computes the start time at which the user starts using the peripheral from the timer in the main machine of the server system (S4) and stores it into the event information storage area prepared in the above, or event information storage table (2-12) (S5).

The data to be output is also supplied to the driver. The driver verifies the data and determines and stores what the data contains (S6). Then, the driver determines and stores from which client the output request is made and identifies the user (S7).

When all these pieces of information have been stored, the driver identifies the application (2-6) to which task start event (2-9) is to be issued. This can be done using the application IDs previously registered by the ID recognition function (2-8) in the driver (S8). If the identified application ID does not exist, there is no need to issue the event. In this case, these pieces of the event information are discarded. The driver issues an event to the application based on the event-target application ID (S10).

When the use of the peripheral has been ended (S21), the driver verifies the event ID prepared at the start. If this event ID does not exist, this indicates that some malfunction has occurred, so an appropriate error treatment is performed (S22). When the verification is normally done, the driver calculates the finish time based on the timer in the machine (S23) and stores it (S24). Also for this information, the driver obtains the event-target application ID (S25) and issues the task finish event (2-10) (S26).

Figure 15:
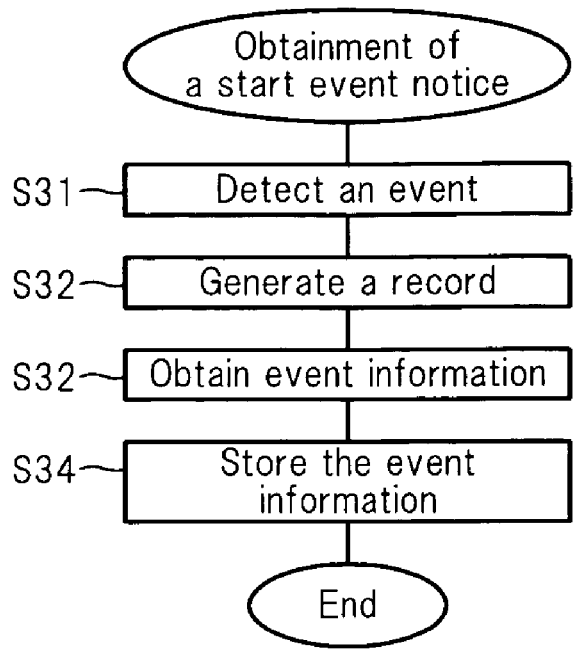
FIG. 15 is a flowchart showing the flow (in the application) for recording the operation history, in accordance with the present invention.
Figure 15:
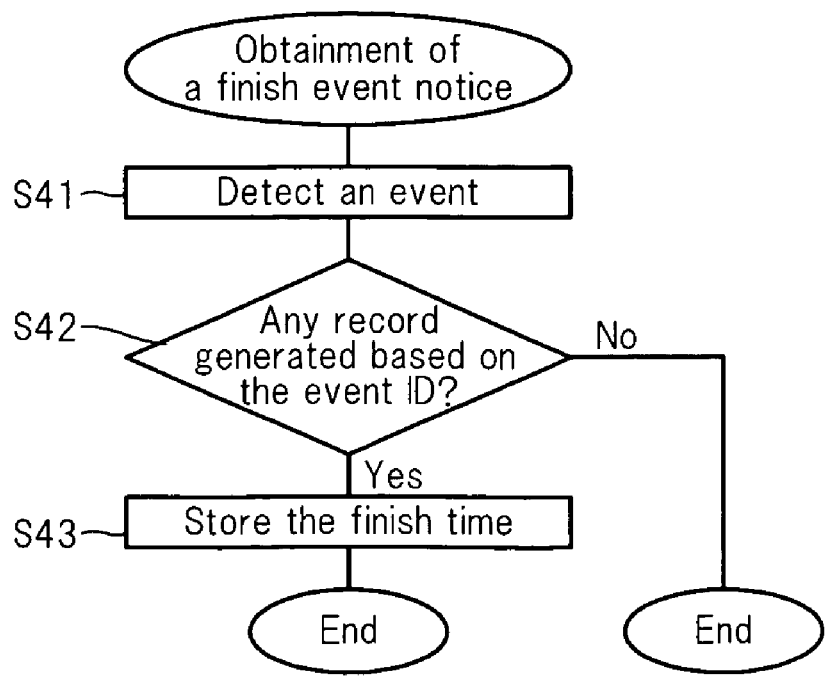

Next, based on FIG. 4 and the operation flow (in the application) shown in FIG. 15 for recording the history, the flow of operation history recording in the application will be described.

When the drive transmits the print start event or print end event to the application, the application stores the event information into the storage area. FIG. 15 shows this flow of operation.

The application (2-6) detects the task start event (2-9) (S31), then, generates based on the event code a record (4-4) for storing the event information within the peripheral usage frequency table (1-10) (S32). The reason the record is generated based on the event code is because the start event (2-9) and finish event (2-10) are necessarily paired and the finish event is asynchronous and arises late. The event information is obtained by calling an external function prepared in the driver, i.e., the event information retrieval external reference function (2-11) (S33). The obtained event information is stored into the record previously generated (S34).

When the operation of the peripheral is ended and finish event (2-10) is detected (S41), the application searches for the record (4-4) generated when the start event was detected based on the event ID (S42). When the record is found, the record (4-4) must have only task finish time (4-9) unrecorded, so the task finish time is stored to complete the series of history recording.

Figure 16:
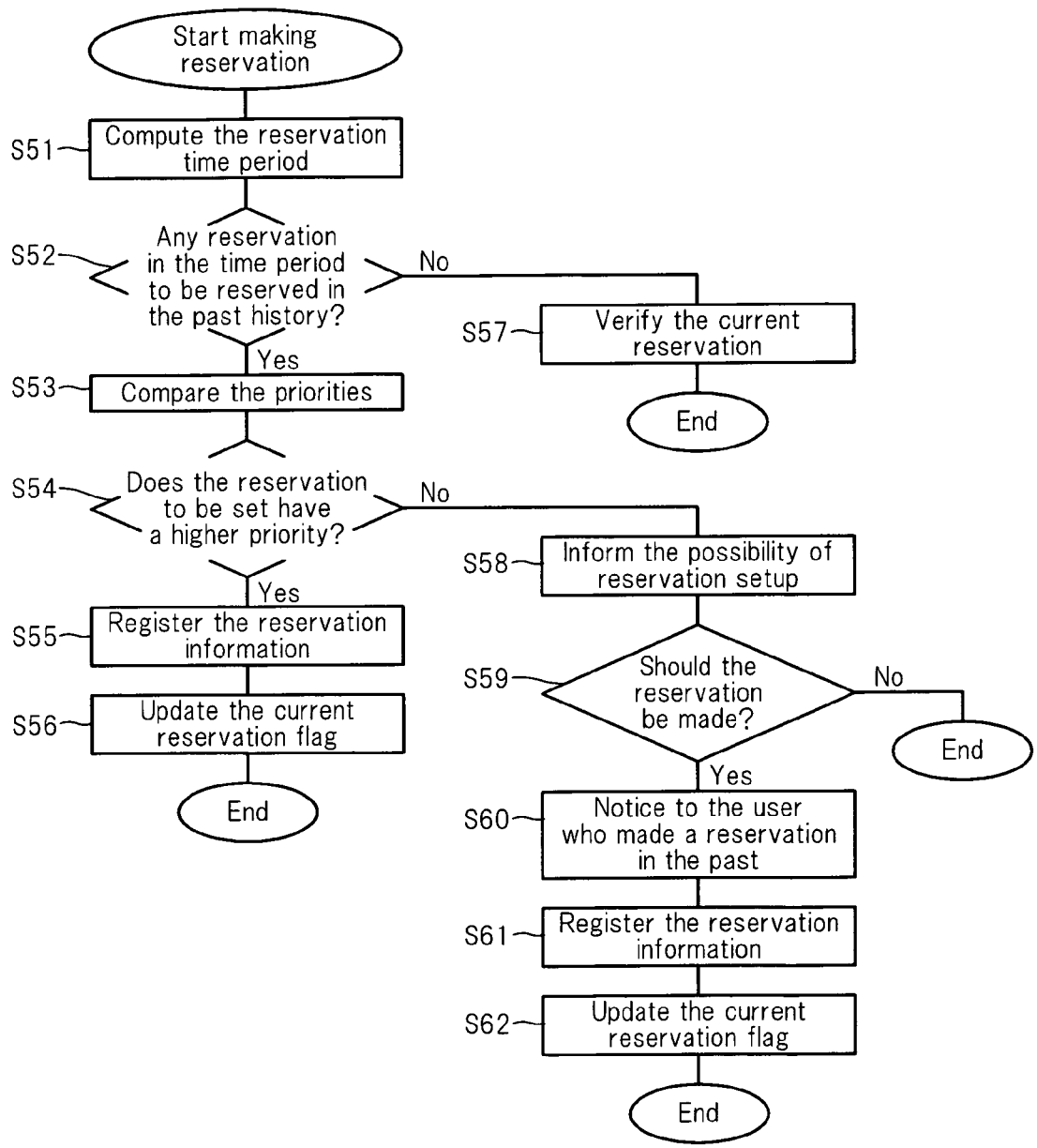
FIG. 16 is a flowchart showing the flow for making reservations of a peripheral, in accordance with the present invention.

Referring next to FIG. 16, the operation when a user makes a reservation of the peripheral will be described.

FIG. 16 shows the flow for making a reservation of the peripheral. The operation when a user makes a reservation is as follows.

The user sets up a reservation through the frame of the peripheral reservation setup function (1-16) of the present application prepared in the client system (1-3) shown in FIG. 11. The information to be set for making a reservation includes the user name, a peripheral to be used, start time, finish time and priority (see FIG. 9). The user inputs these pieces of information through the peripheral usage reservation frame of the peripheral reservation setup function (1-16) and presses the register button in the same frame, whereby the information is registered from the client system (1-3) into server system (12-1).

When a reservation is input, the server system (12-1) performs two types of verification for information register. The first one is to check whether any reservation in the past has been made in the time period of the reservation to be made. Since it is possible for the present system to detect whether any reservation has been made in the time period, from the past history i.e., based on the flag area in the peripheral usage predicting table (1-13) shown in FIG. 7, it is possible to know the possibility that another reservation might be set up within the time period of the reservation to be made. First, the reservation setup time is computed (S51). Then it is compared with the past reservation history using the verified result flag area (8-3) (S52). When it is found from the result that no corresponding reservation existed in the past, the operation is followed by the next step where the reservation to be made is compared with the current reservations (S57) using the current reservation flag (8-4).

In the first step, when a reservation in the past is found, comparison as to priority is made (S53). If the current reservation has a higher priority (S54), the reservation information is registered (S55) and the current reservation flag is updated (S56) to complete the series of reservation procedures. If the current reservation has a lower priority (S54), the system informs the user that there is a possibility that a reservation having a higher priority over the current reservation will be made in the same time period (S58) and inquires whether the reservation should still be made (S59). If the user's answer is negative, the procedure is ended without making any reservation. If a user has made the reservation, the system informs the potential user or users who are on the history that another user has made a reservation in the time period during which the potential users might use the peripheral (S60). With regard to this notice, the information only is given and no reserving operation will be made. Thereafter, the reservation information is registered (S61) and the current reservation flag is updated (S62) to thereby complete the series of reservation procedures.

Figure 17:
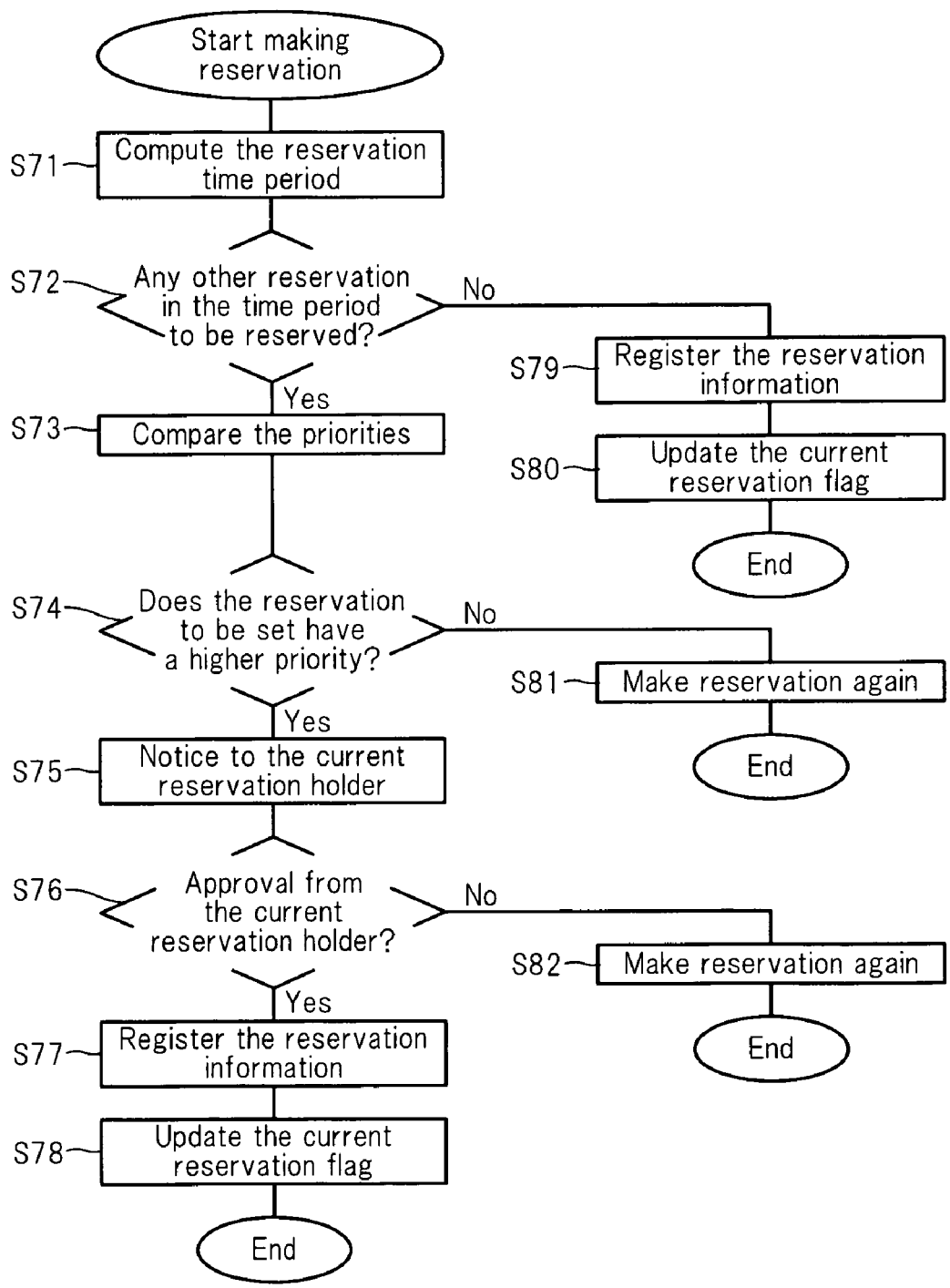
FIG. 17 is a flowchart showing the continuation of the reserving process (referencing to the current reservations), in accordance with the present invention.

As the second step, when no reservation has existed in the past history, the operation is followed by the next step where the reservation to be made is compared with the current reservation status, as shown in FIG. 17.

In FIG. 17 (continuation of the reservation process), the time period of the reservation to be made is computed (S71), so as to determine whether any record (9-2) in the same time period exists within the current reservations (S72). The current reservations have been stored as records (9-2) in the reservation management table (1-12) in the server system shown in FIG. 9.

When no current reservation is found, the reservation information is registered (S79) and the current reservation flag is updated (S80) to thereby complete the series of reservation procedures.

When there is a reservation already made, the priorities are compared (S73). From this comparison, if the reservation to be set has a lower priority (S74), the reservation in that time period is not allowed. Therefore, the user is forced to change the reservation (S81). The system informs the user trying to make a reservation of the fact, by displaying it on the display frame of the display function (1-15) of the application in the working client system (1-3) shown in FIG. 13. The notice frame has an entry area for allowing the user to make another reservation, displaying the permissible time periods around the time period which was first attempted to be reserved. This display of input permissible time periods can be displayed during the first attempt at reservation, dependent on user preference.

In contrast, if the reservation to be set has a higher priority, there is a possibility that the currently made reservation should be replaced. More specifically, if the reservation to be set has a higher priority (S74), the currently registered reservation is low in priority so that the system notifies this fact to the user who has already made the reservation (S75). The notice should include the fact that a user having a higher priority is trying to set a reservation in the same time period and an inquiry as to whether the user will permit it. As a result, if the current reservation holder does not agree (S76), the system notifies the rejection to the user trying to make a fresh reservation, the subsequent user must set up the reservation after negotiation with the reservation holder or make a reservation in another time period (S82). When the change is approved (S76), the reservation information is registered (S77) and the current reservation flag is updated (S78) to thereby complete the series of reservation procedures.

In the above way, reservations are made considering the priorities. For allotting the priories, the priority is graded into ten levels 1 to 10 with level 10 assumed to be the highest priority. When the priorities are allotted based on the degree of task urgency, the priority should be set beforehand in the server system, under the consensus of the users.

As has been described heretofore, the present invention has the beneficial effects as follows.

According to the present invention, the usage histories of the users of a peripheral are automatically registered so that the time periods in which the peripheral could be used can be estimated based on the usage histories. This configuration enables the tasks of users to be smoothly done. That is, it is possible to manage the reservations of a peripheral taking into account the actual situations of the users.

According to the present invention, since the usage frequencies of a peripheral are extracted and determined in a time based series, in arbitrary time spans, such as hours, days, weeks, months, terms, years as the unit, to predict the possibility of the use of the peripheral and make its reservations, it is possible to easily grasp the time schedule. Further, it is possible to grasp an improved view of the usage schedule.

According to the present invention, the system is configured so that if the peripheral is not used at the reserved time, a forenotice of cancellation is given to the user who made the reservation. Since the user who receives the reservation notice or the forenotice of reservation cancellation is allowed to make a modification request, it is possible to prevent lowering of the operating rate due to the peripheral being unused at the reserved time.

According to the present invention, since reservation items left behind after their reserved times are automatically cancelled, this configuration improves convenience for other users.

According to the present invention, since the conditions under which a user's reservation is made are determined based on the priority and reservations are changed based on the conditions, it is possible to improve the work efficiency of the entire group by taking into account the reservation priorities.

According to the present invention, since the user priorities for making reservations are determined based on the degree of task urgency of individual users and the reservations are changed based on the user priorities, it is possible to improve the work efficiency of the entire group by taking into account the degree of task urgency when reservation of each user is set up.

According to the present invention, the system has a means for informing the user of setup, modification and cancellation of reservations, the user, when receiving the notice, is able to grasp the varying reservation status and hence make a timely reservation.

What is claimed is:

1. A usage reservation system for setting up connected reservations of peripherals on a network, the network including a server system and a plurality of client systems interconnected to the server system, the usage reservation system comprising:
   a plurality of peripherals operably connected to the server system, the peripherals selected from the group comprising printer, scanner, and facsimile machine;
   a driver for allowing the client systems to use the peripherals;

a detecting portion for detecting the use of the peripherals by a client system;

a usage frequency management table for recording a past reservation history of the peripherals by each user and a usage history frequency management portion;

a reservation management table for registering reservations of each user for usage time periods of the peripherals based on the past reservation history of the peripherals, and predicting the usage time periods of each peripheral, wherein the usage time period of each peripheral is calculated based on a start time and a finish time inputted by a user;

a data content detecting portion for detecting the content processed through the driver; and a data content management portion for recording the content, the usage reservation system further comprising a usage reservation management portion for recording the setup usage reservations of the peripheral into the reservation management table.

2. The usage reservation system for networked peripherals according to claim 1, further comprising a usage reservation control portion for changing reservations in response to a user request from a client system.

3. The usage reservation system for networked peripherals according to claim 1, wherein the usage reservation of the peripheral is predicted by extracting and operating the usage frequencies in a time based series, based on the data from the usage frequency management portion and the data content management portion, in arbitrary time spans, and a reservation is made based on that usage prediction.

4. The usage reservation system for networked peripherals according to claim 1, further comprising a means for giving a forenotice of cancellation of a reservation when the reservation is not executed at the reserved time, to the user who made the reservation, wherein the user who receives the reservation notice or the forenotice of reservation cancellation is allowed to make a modification request.

5. The usage reservation system for networked peripherals according to claim 1, wherein a reservation item left behind after its reserved time is automatically cancelled.

6. The usage reservation system for networked peripherals according to claim 1, wherein the conditions under which a user's reservation is made are determined based on the priority and reservations are changed based on the conditions.

7. The usage reservation system for networked peripherals according to claim 1, 2, 3, 4, 5 or 6, wherein the user priorities for making reservations are determined based on the degree of task urgency of individual users and the reservations are changed based on the user priorities.

8. The usage reservation system for networked peripherals according to claim 1, 2, 3, 4, 5 or 6, further comprising a means for informing the user of setup, modification and cancellation of reservations.

9. A usage reservation system for setting up connected reservations of peripherals on a network, the network including a server system and a plurality of client systems interconnected to the server system, the usage reservation system comprising:

a plurality of peripherals operably connected to the server system, the peripherals selected from the group comprising printer, scanner, and facsimile machine;

a driver for allowing the client systems to use the peripherals;

a driver event detecting portion for detecting a driver event;

a usage frequency management table for recording a past reservation history of the peripherals by each user and a usage history frequency management portion;

a reservation management table for registering reservations of each user for usage time periods of the peripherals based on the past reservation history of the peripherals, and predicting the usage time periods of each peripheral, wherein the usage time period of each peripheral is calculated based on a start time and a finish time inputted by a user;

a data content detecting portion for detecting the content processed through the driver; and a data content management portion for recording the content, the usage reservation system further comprising a usage reservation management portion for recording the setup usage reservations of the peripheral into the reservation management table and a usage reservation control portion for changing reservations in response to a user request from a client system.

* * * * *